United States Patent [19]

Johnsen

[11] Patent Number: 5,249,851
[45] Date of Patent: Oct. 5, 1993

[54] METHOD AND SYSTEM FOR NON-LOCKING AND NON-SKIDDING BRAKING/TRACTION OF A VEHICLE WHEEL

[76] Inventor: Oddvard Johnsen, Eikesvingen 8, 3400 Lier, Norway

[21] Appl. No.: 947,837

[22] Filed: Sep. 21, 1992

Related U.S. Application Data

[63] Continuation of Ser. No. 582,937, Oct. 9, 1990, Pat. No. 5,195,808.

[30] Foreign Application Priority Data

| Apr. 7, 1988 | [NO] | Norway | 881513 |
| Feb. 16, 1989 | [NO] | Norway | 890663 |
| Apr. 7, 1989 | [NO] | Norway | 8900029 |

[51] Int. Cl.⁵ ............... B60T 8/52; B60K 31/04
[52] U.S. Cl. ............... 303/104; 303/113.2; 364/426.03; 180/197
[58] Field of Search ............... 180/197; 188/135–138; 303/1, 9.69, 20, 22.1, 24.1, 61, 112, 113 TR, 113 SS, 104, 106; 244/111; 364/426.01–426.03

[56] References Cited

U.S. PATENT DOCUMENTS

| Re. 33,697 | 9/1991 | McNinch, Jr. | 303/7 |
| 3,404,923 | 10/1968 | Smoren | 303/61 |
| 4,001,642 | 1/1977 | Skoyles et al. | 361/238 |
| 4,112,428 | 9/1978 | Dorsman | 341/158 |
| 4,457,237 | 7/1984 | Theurer et al. | 105/61 |
| 4,477,123 | 10/1984 | Schniirer | 303/24.1 |
| 4,583,611 | 4/1986 | Frank et al. | 180/197 |
| 4,646,242 | 2/1987 | Valaas | 364/426.01 |
| 4,768,840 | 9/1988 | Sullivan et al. | 303/22.1 |
| 4,804,237 | 2/1989 | Gee et al. | 303/7 |
| 4,818,035 | 4/1989 | McNinch, Jr. | 303/7 |
| 5,029,947 | 7/1991 | Knight et al. | 303/7 |

FOREIGN PATENT DOCUMENTS

| 3345913 | 6/1985 | Fed. Rep. of Germany | 303/22.1 |
| 165856 | 7/1991 | Norway . | |
| 382781 | 2/1976 | Sweden . | |
| 394984 | 7/1977 | Sweden . | |
| 413082 | 4/1980 | Sweden . | |
| 1347033 | 2/1974 | United Kingdom . | |

*Primary Examiner*—Robert J. Oberleitner
*Assistant Examiner*—Alfred Muratori
*Attorney, Agent, or Firm*—Jacobson, Price, Holman & Stern

[57] ABSTRACT

System and methods for achieving optimum braking/traction for a vehicle wheel, based upon measurement of road normal and road parallel force on the wheel axle. The measuring signals are continuously recorded in an electronic control unit which undertakes running calculations of the friction coefficient of the wheel against the ground, as well as the variation of the coefficient. The braking force is altered in a continuous manner on the basis of the values of the friction coefficient and the variation thereof, in either an increasing or decreasing direction so that optimum slip for the prevailing conditions is set quickly to achieve optimum braking or traction.

7 Claims, 3 Drawing Sheets

METHOD AND SYSTEM FOR NON-LOCKING AND NON-SKIDDING BRAKING/TRACTION OF A VEHICLE WHEEL

This is a continuation of application Ser. No. 07/582,937, filed Oct. 9, 1990, now U.S. Pat .No. 5,195,808.

BACKGROUND OF THE INVENTION

The present invention concerns systems and methods for braking of and traction for wheeled vehicles, and more particularly optimum braking and traction under any road or ground conditions.

The principles utilized in the present invention are to a certain extent described in Applicant's previous Norwegian patent application no. 88.1513, which hereby is incorporated by reference.

Traction is in the present context meant to be understood as the powered acceleration of a wheel, i.e. the opposite of braking.

The present invention has particularly been developed in connection with the need of ability to undertake braking, or possibly traction, while utilizing maximally the attainable friction coefficient between a wheel and a ground course, particularly with pneumatic tires and the surface of runways and roads. Said friction coefficient, usually designated $\mu$, depends on weather conditions, and may therefore vary considerably. As will be explained in more detail later in this specification, the friction coefficient $\mu$ also is strongly dependent on the so-called "slip" conditions of the wheel. A precise and fast adjustment to the optimum braking force value is of considerable benefit for example to a pilot in an airplane at departure and landing, because such an adjustment renders possible optimum braking and avoidance of skidding.

For a railway train also the acceleration phase is important, since optimum utilization of power and minimum wear of material is achieved by rapid adjustment of the optimum traction, so that unnecessary and damaging wheel skidding is avoided and the train reaches its cruising speed in the fastest possible manner.

Also for ordinary motor vehicles, i.e. cars, lorries, tractors etc., good automatic braking systems, i.e. non-blocking systems, are of interest for safety reasons. In particular cases, also an effective traction control may be advantageous, for example in sports-like driving and in driving outside roads in rugged terrain.

Braking systems have been developed previously, which systems seek to avoid blocking the wheels during a hard braking action, but it has turned out that these systems may give results which are not completely satisfactory, which fact has led to a few airplane accidents in the braking phase, which accidents might have been avoided. The problem is often that the existing systems do not really know the state of movement of the airplane, only whether the wheels are rotating or not.

Previously known braking systems for cars are also usually based upon sensing the rotational state of the wheels—if the wheel stops rotating, the braking power is cut. In some related systems, i.e. mainly systems for measuring friction, particularly between an airplane wheel and the runway, the friction force is measured for a wheel during braking, at a certain slip factor for the wheel. The slip factor gives an expression of the slip or the sliding between a rotating wheel and the ground. It is necessary that a wheel is subjected to slip in order that horizontal forces be transferred when the wheel is rolling. In this connection the slip factor S is defined as $$S = \frac{n_k - n_b}{n_k}$$

in which $n_k$ is the number of revolutions of a freely rotating wheel in contact with the ground, and $n_b$ is the number of revolutions of the braked wheel.

In the formula above the slip factor is a number between 0 and 1, however said factor may also be expressed in percent, i.e.

$$S = \frac{(n_k - n_b)100}{n_k}$$

and the slip factor will then be a number between 0 and 100. 100% slip thus means a locked, braked wheel (total panic braking), and 0% means no braking of the same wheel, i.e. a freely rotating wheel.

In airport runways it has become usual to make friction measurements with a slip factor between 15 and 17%. However, the friction coefficients or friction forces obtained in these measurements, will only be correct, i.e. the maximum possible values, for one particular type of ground conditions. It has turned out as a fact that the slip factor which provides maximum runway friction, will be lower under dry summer conditions and higher under slippery winter conditions. In other words, a higher slip factor should be set for use under slippery winter conditions than under dry summer conditions.

Non-blocking braking systems comprise means for improving the braking action for a wheeled vehicle by providing a reduction of the braking force acting on a wheel if said wheel tends to lock or block in a manner which will give starting of skidding after the actual brake application, and said means will thereafter provide a new increase in the braking force without necessitating any change in the current braking manoeuver (of a car driver or operator using the brake) which has caused the actual brake application. Such braking systems are advantageous as to reducing the danger of swerving with blocked wheels, and for maintaining the steering ability during braking, and they may also provide a reduction of the braking distances.

When a braking force is supplied to a wheel for reducing the vehicle speed, a certain percentage of slip is introduced, i.e. the braked wheel rotates slower than the free rolling speed which the wheel would have for maintaining the instantaneous vehicle speed, and this fact is due to the friction force between the wheel tire and the ground. When the braking force is increased, there is also an increase in said friction force, and simultaneously the percentage of slip increases until the friction force reaches a maximum value at a percentage of slip (slip factor) usually between 10 and 30%, and thereafter the friction force decreases with a further increase in the braking force, and at the same time the slip factor increases to 100%, with locking of the braked wheel. Still a friction force is present to retard the vehicle (sliding friction), however this value is lower, and often essentially lower than the maximum possible friction force.

The well known expression for the friction coefficient $\mu$ is given by $$\mu = F/N$$

in which N is the normal force from the ground on the object lying on the ground, i.e. in this case the wheel, and F is the friction force. If one at first supposes that the normal force N, which ordinarily is equal to or directly proportional to the weight of the object (in the case of a car, the car weight divided by the number of wheels), is maintained constant, it is clear that the friction coefficient $\mu$ is directly proportional to the friction force F. What has been stated above regarding variation of the friction force, can therefore in this case equally well be stated regarding the friction coefficient $\mu$. Thus, $\mu$ varies in accordance with the value of the slip factor (see FIG. 1).

From Swedish laid-open publication 394 984 a non-blocking braking system is known, in which the braking force is controlled in such a manner that the wheel supposedly is maintained rolling within the region of maximum friction force between the tire and the road, i.e. within a region which possibly may be more specifically defined and in which region optimum slip percentage is achieved, but the necessary information about the actual slip percentage is not provided in the method according to said laid-open publication, paradoxically, nor can any information be found regarding the forces in question. An electrical control circuit is used for detecting wheel rotational states where wheel blocking threatens as a consequence of too powerful braking, together with an electromagnet valve which is activated via the control circuit for reducing the brake fluid pressure. More specifically, this previously known solution is based upon utilization of means for providing a DC signal, the amplitude of which is a function of the rotation speed of the wheel, and no other physical parameters than wheel rotation speed are detected. Thus, the system does not know how the vehicle moves, and in reality the system functions poorly just in those cases where it is most needed, namely when braking the vehicle under slippery conditions, i.e. with typically low values of the friction coefficient. A problem will also exist at low speeds, since the measuring signal in this case will not be very useful. The problem is, as previously mentioned, that irrespective of electronic "smartness" as to use of reference values for maximum allowed retardation of wheel rotation, the basic information about how the vehicle is really moving, is missing.

From Swedish laid-open publication 413 082 there is known a slide-preventing control device for braking a vehicle. Also in this case the aim is preferentially to maintain the slip within a region which is coordinated with a maximum friction coefficient. Periodic modulation of the wheel torque is used together with wheel acceleration measurements in order to determine the direction of change of the friction coefficient from an optimum value as a function of slip, while an integral/-proportional control of the pulse modulation is supposed to render possible a compensated variation of the wheel torque and the slip state into a state providing optimum friction force. The control device may be utilized for preventing skidding of the vehicle not merely during braking, but also during acceleration. However, this system has the same weaknesses as the previously mentioned system, since merely the wheel rotation and the variation thereof is detected.

In contrast hereto, there is known from Swedish laid-open publication 382 781 a system for preventing blocking of a vehicle wheel, which system lies closer to the system dealt with in the present application. In SE 382 781 one measures the horizontally acting reaction force on the wheel axle, which reaction force is proportional to the friction force between the wheel and the ground, and a signal representing the measured road parallel force, is used for controlling the braking power in such a direction that the friction force is maximized. This system can only be utilized in connection with braking, and the system does not take into account variations in the road normal force N. It should at this point be emphasized that particularly during braking or acceleration phases the reaction force will cause a fast change of the road normal force for the individual wheels. When N varies, F, that is the road parallel force, may experience a necessary change due to the change in N. The known system will misinterpret such a situation, and believe that the change in F is due to applying an incorrect braking power, even though the instantaneous braking power is actually correct. Possibly the direction of the immediately necessary change of braking power may be misinterpreted when F is influenced by a change in N. Thus, the known system will be "fooled" in a situation like this, and will therefore use more time for adjusting to the correct slip value than what is optimum.

SUMMARY OF THE INVENTION

The present invention aims to improve the last mentioned system, by providing methods and devices for achieving optimum braking/traction of a wheeled vehicle, by measuring both road parallel and road normal forces and using runningly calculated friction values for optimizing the braking power. Using the invention, auto-tracking toward optimum braking or traction force is achieved on any ground surface and in any situation.

The invention is defined precisely by means of the enclosed patent claims.

Thus, using the systems/methods in accordance with the present invention, that slip factor is sought which provides maximum friction coefficient. As long as the normal force N stays constant, maximizing the friction coefficient $\mu$ will be exactly the same as maximizing the road parallel force or the friction force F. But if the road normal force is changed abruptly, namely just during braking or acceleration, a computer calculation based upon measurement of both road parallel and road normal force, and including a calculation of the friction coefficient $\mu$ as well as the variation thereof, adjusts into a state of correct slip value under existing road and weather conditions faster than the previously known solution according to SE 382 781.

BRIEF DESCRIPTION OF THE DRAWINGS

The invention shall be described in more detail below, referring to the drawing figures, in which.

DESCRIPTION OF PREFERRED EMBODIMENTS

The ability to stp or accelerate a vehicle is principally determined by the characteristics of the contact area between the road surface and the wheel surface, and these characteristics are often described by stating the friction coefficient $\mu$, which is defined as the ratio between the friction force opposing the motion between the two surfaces and the force between the surfaces perpendicular thereto, in accordance with the mathematical expression defined previously in the description. Concerning rolling surfaces, $\mu$ is furthermore a function of the slip parameter, which has also been defined above.

Figure 1:
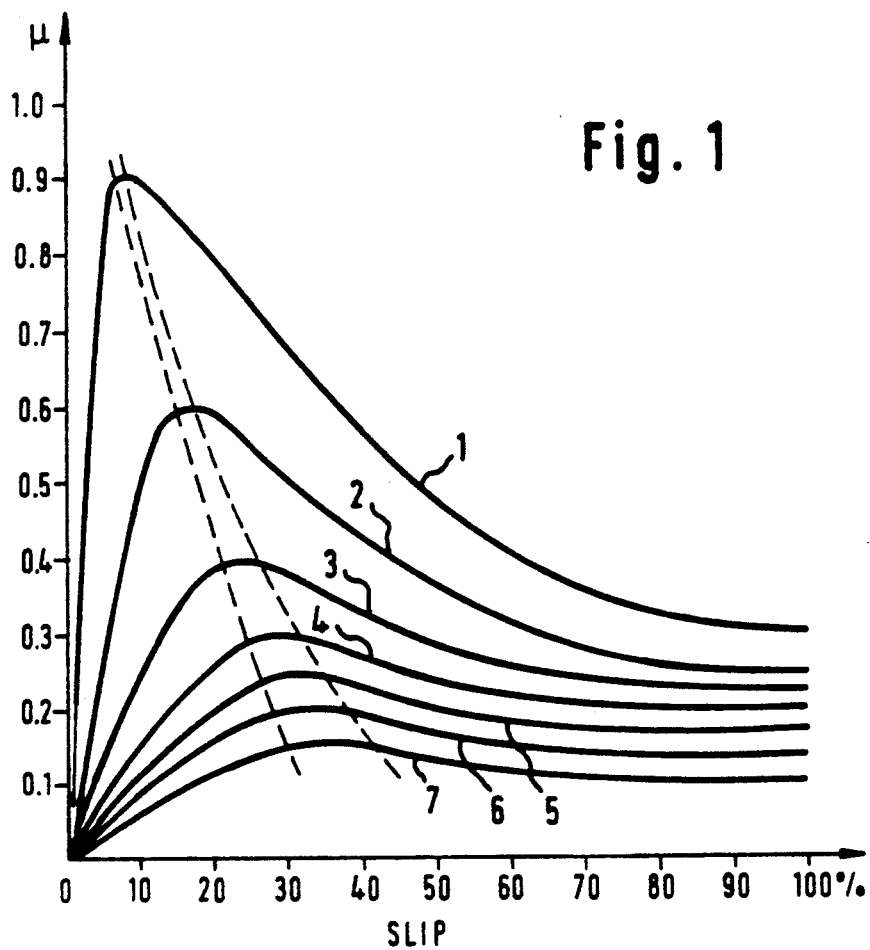
FIG. 1 shows typical friction coefficient/slip curves for different road conditions, as well as an indication of the variation region for optimum slip/maximum braking effekt.

It is previously known that the variation of the friction coefficient depending on slip, for many different sorts of road surfaces and wheel tires or wheel surfaces generally follow such measurement curves as displayed in FIG. 1, in which $\mu$ is shown as a function of slip. An important characteristic of these curves, is that $\mu$ in each case has a maximum value. The particular shape of the curve is without importance, since the shape may vary within wide limits according to the conditions, inter alia the speed. The fact that a maximum value exists, entails that the skid-preventing braking system preferably should function in such a manner that braking occurs at just this maximum value of the friction coefficient, if the shortest possible braking distance (maximum braking ability) is desirable, respectively in such a manner that traction is exercised at such a maximum value if the best possible acceleration of the vehicle is desirable.

In FIG. 1 curve 1 relates to a typical pneumatic rubber wheel against a dry and firm road surface, giving typically high $\mu$ values, for example $\mu_{max}=0.9$, and the remaining curves 2-7 relate to the same pneumatic rubber wheel upon successively "worse roads", curve 7 typically relating to winter road conditions of a relatively slippery type, with a maximum friction coefficient $\mu_{max}=0.15$. It should be noted that the region of optimum slip is located differently for the different types of road surface or road "conditions". For curve 1 optimum slip is located at about 7,5%, for curve 2 optimum slip is found at about 15%. while for curve 7 a slip of about 35% should be preferred in order to achieve the best possible retardation effect under these conditions. An indication of the optimum slip region is shown by means of the dashed lines in FIG. 1.

In other words: If the shortest possible braking distance, or possibly the best possible traction/acceleration is desirable, then the braking force/traction power must be controlled in such a manner that the wheel rolls inside the region of maximum friction force between the wheel surface and the road surface, i.e. within the region for achieving optimum slip.

It should be noted that for railway locomotives, with steel wheels resting upon rails, the optimum slip region is located at about 2-5% under normal conditions, i.e. rather far to the left in the diagram as shown in FIG. 1. An anti-skid system which works well, will be of great value in a case like this, in which uncontrolled skidding often will appear when using manual methods, both in traction and braking. Traditional wheel rotation sensors also function very poorly when a train is in the starting phase, with a very low wheel rotation speed. A system like the one according to the present invention is able to provide the necessary control of both the traction and the braking phase.

Figure 2:
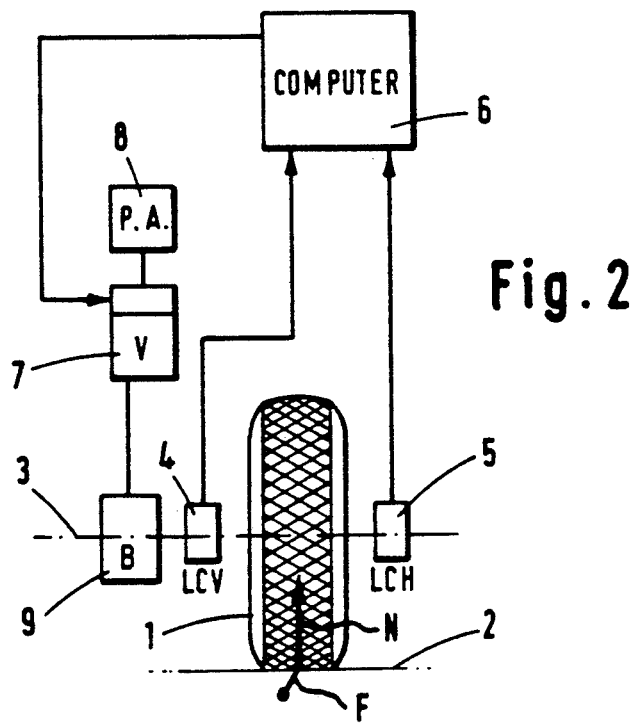
FIG. 2 shows in a purely schematic manner signal circuits in connection with a vehicle wheel.

In FIG. 2 is shown the general principle for the braking system in accordance with the invention. The wheel on the surface 2 has an axis 3 which represents a wheel axle. Two load cells, 4, 5 are mounted for measuring respectively horizontal reaction force in the wheel axle corresponding mainly to the current friction force F between the wheel surface and the ground surface, and the vertical reaction force in the wheel axle, which force mainly corresponds to the vertical force N from the road surface 2 against the wheel 1. In parenthesis it should be noted that with a view to driving i slanting terrain, in the following the expressions "horizontal" and "vertical" will be substituted by "road parallel" and "road normal" concerning the forces in question which occur in the engangment point between wheel 1 and road surface 2.

The measuring signals from the two load cells 4 and 5 are passed to a computer 6 of microprocessor type, which in principle carries out the following operations:

a) Successively and with short intervals, the current friction coefficient is calculated in accordance with the expression $$\mu = F/N$$

in which F and N symbolically represent the signals from the corresponding load cells 4 and 5. If the load cells should happen to be non-linear, the computer is of course equipped with either a correction circuitry near the input, or a programmed correction processing of these signals before calculating the friction coefficient.

b) The current friction coefficient is compared with the previous friction coefficient.

c) In accordance with a well defined program, which program it is not necessary to describe in detail in this specification, the computer 6 then controls a proportional valve 7 which regulates the power from a hydraulic pump unit 8 to the disc brake 9. The program strategy is as follows: As long as a calculated $\mu$ is larger than the previous one, the braking power is increased with a predetermined or empirically determined increment. As soon as $\mu$ starts to decrease, the braking power is lowered quickly using a somewhat larger increment, which is also predetermined or empirically determined, and thereafter the braking power again increases successively, and a cycle as described above, restarts. In this manner there is achieved a rapid hunting of and "commuting around" the summit in question for a friction coefficient/slip curve, i.e. within the indicated optimum region shown in FIG. 1, and the braking effect will be maintained in the optimum region under the given conditions.

Figure 3:
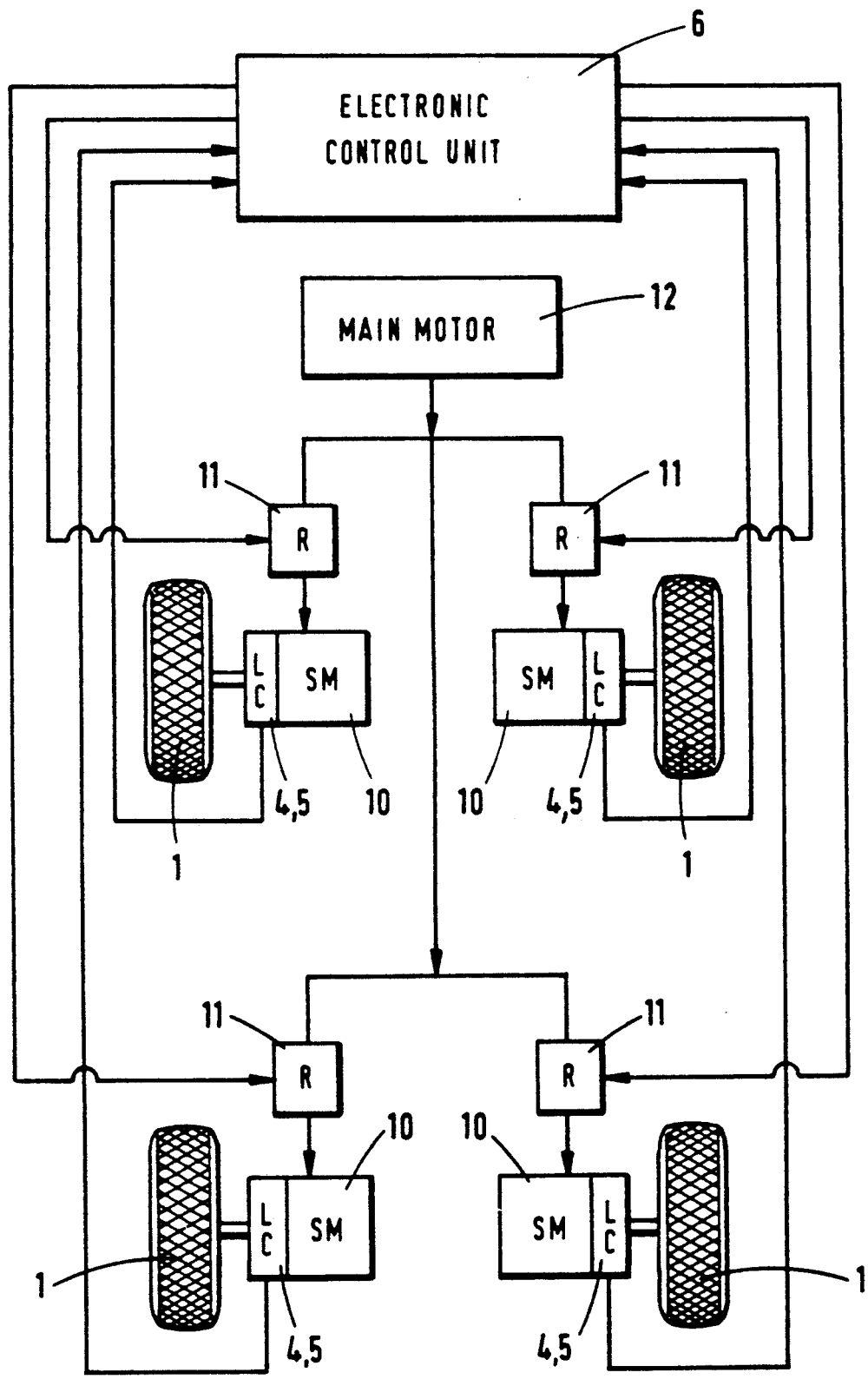
FIG. 3 shows a schematic diagram of a traction system.

The same type of control is achieved in a system for traction. It is referred to FIG. 3 which shows an example of a traction system in accordance with the present invention. FIG. 3 displays a system for a four wheel vehicle with separate operation of all four wheels 1. In the shown case each wheel 1 is monitored by two load cells 4, 5, or possibly a load cell with double action, as will be explained later, and all load cells are connected to the computer or the electronic control unit 6. As mentioned previously, each wheel 1 is separately operated by its own servo-motor 10, the torque of which is controlled by separate pressure regulators 11 for the pressure from a main motor 12, and said pressure regulators 11 receive their power signals from the electronic control unit 6 on the basis of corresponding current calculations as described in the braking case above. One has contemplated at this point the system mounted in an all-terrain 4-wheel drive vehicle, in which optimum traction in any situation and for each wheel separately is of great importance. Of course, nothing prevents that the number of separate driving motors and separate force measurement devices for the road parallel and the road normal force are adapted for the particular case. It is of course possible to combine two wheels on one axle, possibly only make measurements for one single of all the wheels, etc. However, a system like the one displayed in FIG. 3 will be an optimum system, since the road or ground conditions in principle may vary from one wheel to another.

Previously in this specification there was mention of the possibility of utilizing "double action" force measurement devices or load cells. It is of course a fact than when two orthogonally directed forces are to be measured simultaneously, it will be possible to measure their resultant in a tilted direction. Thus, in particular cases it may be favourable to arrange only one single force measuring device, so that the signal from this device to the electronic control unit is pre-processed in order to find the two components in question, i.e. the road parallel F and road normal N. To be able to execute the calculation, of course the angle of the measured force in relation to e.g. the road parallel direction must be known. If this angle is known to be stable, the conversion may be executed in a simple manner using simple trigonometric relations. In certain cases, displacements or torsions of those materials which the load cells are mounted in or on, must be taken into consideration, and it may then be necessary to utilize a separate angle sensor which is also connected to the electronic unit so that the correct angular relations can be considered during the calculations. However, there exists also a third possibility, namely that the torsion and displacement conditions are investigated experimentally in a production phase, so that the electronic control unit may be programmed for executing compensating angular calculations on the basis of the force measurements themselves.

Figure 4:
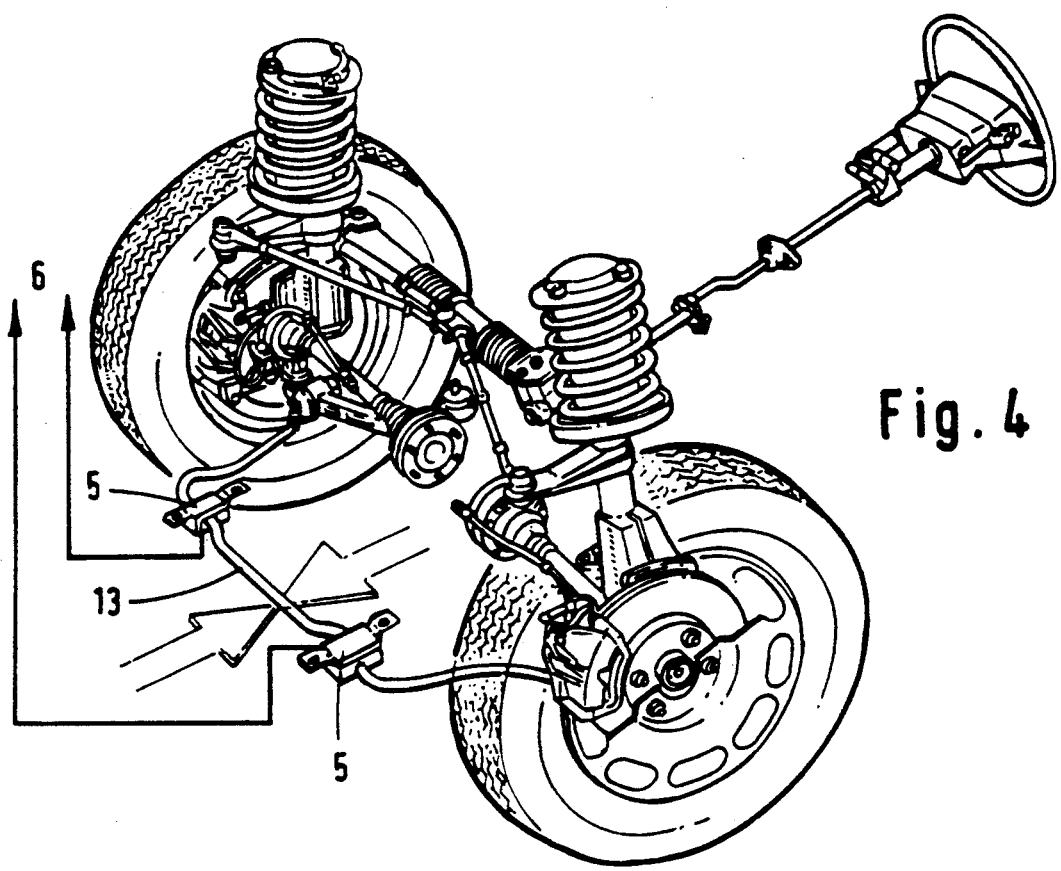
FIG. 4 shows an example of mounting of force measurement devices in a car chassis.
Figure 5:
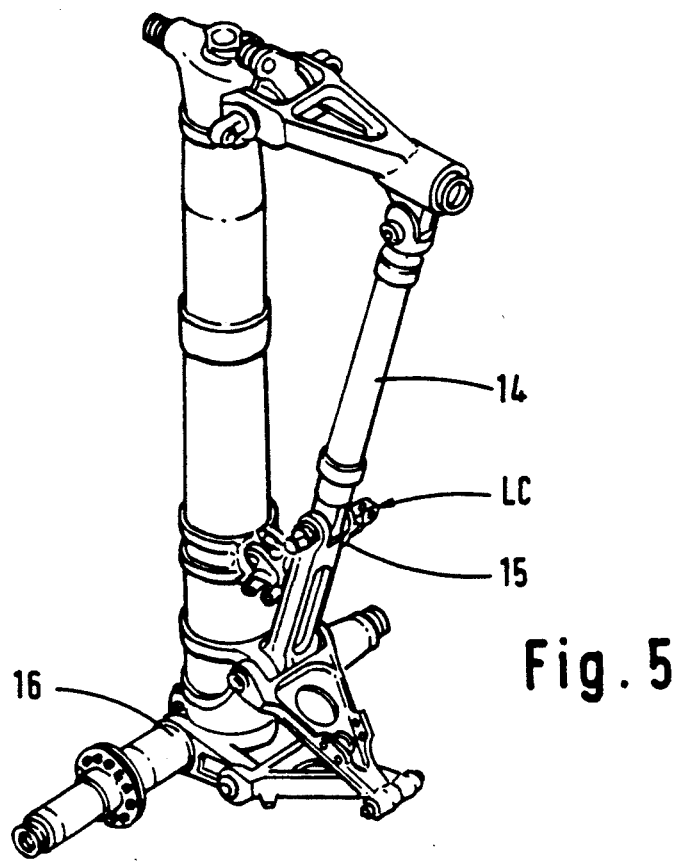
FIG. 5 shows correspondingly an example of mounting of force measuring devices in an airplane undercarriage.

Examples of load cell mounting are shown in FIG. 4 and FIG. 5. In FIG. 4 a typical front wheel chassis of a car is displayed, and in such a case load cells 5 for measuring road parallel forces, as indicated by arrows in the drawing, may be mounted for example in a force-absorbing bar 13 in a position where the bar is normally fixed to the car body, for effective measurement of the reaction force between the body, i.e. the remaining mass of the car, and the wheel suspension. Of course the situation will often be that several elements absorb parts of e.g. the total road parallel force. Thus, the measured force in question can often have a certain and known relation to the total force, and it is of course possible to compensate for this in the electronic control unit 6. Obviously the same holds valid for the road normal force, and such scaling relations can be set and programmed both calculationwise and empirically. Furthermore the situation will be that even when using separate load cells for road parallel, respectively road normal force for a wheel, the current forces or torques which are measures, may be tilted or have certain relations to the actual normally directed or parallel directed force. Where and how the load cells are arranged, will thus vary in accordance with the rest of the vehicle construction.

In certain cases it may be established that during braking or traction, there will not be any considerable variation of the normal force N for the individual wheel. In such a situation it is of course possible to use the simplification which is to leave out measurement of the road normal force N, letting the road parallel force F itself replace the friction coefficient $\mu$ in the calculations of the electronic control unit.

In FIG. 5 there is shown a suitable location for a load cell for measuring the road normal force, or a tilted force from which the road normal force N may be calculated, in an airplane wheel undercarriage. The slanted bar 14 transmits forces which are closely related to the road normal forces in question. In joint 15 is situated a bolt which may be modified in a simple manner in order to comprise a load cell for transmitting a signal to the computer 6 of the braking system. For measuring the road parallel forces on the wheels, force or torque measuring devices may be utilized, which are mounted in close proximity to the wheel axles, e.g. in the area indicated with reference numeral 16.

Suitable load cells may have many different shapes. For example, strain gauges, semi-conductor force measuring devices or piezo-electric sensors of per se known types may by used. The construction, shape and adaptation of the particular sensor type often must be tried out and "tailored" for the constructions in question, but this side of the matter constitutes an ordinary technical problem to be solved, and does not in itself constitute any part of the present invention.

It is self-evident that in many situations it is not desirable to use the effective, automatic braking or traction system, since for example the braking system used under normal conditions implies a rather hard braking experience, which often will be perceived as unpleasant. Under good friction conditions a braking retardation of 0,5–0,6 G is often achieved, and such a braking is felt as rather dramatic. Therefore, under good conditions and with a long and surveyable braking distance, one will prefer to use the vehicle's brakes in a "manual" manner, slowly and easily. Therefore, in a sensible braking or traction system precautions must be taken to ensure that the system only takes effect when this is actually required. The first obvious possibility is of course the well known "panic braking" in which an unforeseen situation turns up, bringing about a rapid and hard employment of the vehicle brake. In such a case the automatic braking system must of course take over, and for this reason it will be appropriate with a sensor in connection with the driver's or operator's operating device, usually a braking pedal. Such a sensor may respond to either the deflection of the operating device, or the velocity of the operating device. The computer 6 is then provided with stored limiting values for the deflection or velocity of the operating device, and a comparison is made of the current value and the limiting value. When a limiting value is exceeded, the braking system is activated. Another obvious possibility is that e.g. the pilot in an airplane has been informed in beforehand that the landing conditions are difficult, or possibly he may see that the accessible landing runway is shorter than desirable, and he may then order activation of the braking system in advance by pushing a button. Situations may also be contemplated in which for example a "dead man's control" is triggered in a train or some other vehicle, and thereby both triggers the braking power generally as well as the optimum braking system in accordance with the present invention. Possibly other types of emergency situations may be detected and automatically trigger a braking procedure which includes utilization of the optimum braking system in accordance with the present invention.

Obviously it is possible to combine in one and the same vehicle both effective traction and effective braking by "double" utilization of the present invention. One and the same computer 6 is used, and the same set of force or torque measuring devices 4, 5 are used in the combination of a traction and a braking system. The computer 6 will, depending on the state of driving, which is detectable quite simply by sensing the direction of the road parallel force F, respectively activate control devices for motors in a traction phase and control devices for braking power in a braking phase. For example all-terrain vehicles may benefit greatly from such a combination variant of the present invention.

In certain cases the braking executing organs and the controllable motor organs may be constituted by one and the same system, e.g. by using electromotors/generators, which during traction/ordinary driving operate as motors, but during braking conveys energy back to the energy reservoir or the vehicle (electrochemical batteries or other types of reservoir, for instance of the flywheel type) by operating as generators. Such cases may be particularly well adapted for combination with the above mentioned combined traction/braking control system in accordance with the present invention.

Once again it must be underlined that the present control principle for achieving effective traction or braking, in contrast to most previously known systems, are based upon the measurement of forces, and not upon measuring the rotation speed of the wheel. The wheel rpm is not necessary in order that the present invention shall function in a satisfactory manner. Nevertheless, in some cases it may be favourable to include the further information that may be achieved by sensing the wheel rotation speed, so that a further combination effect is achieved.

The ordinary "ABS" brakes used to-day, have the following unfortunate properties:

a) The ABS system is dependent on a certain minimum speed to function properly, because the wheel rotation speed is sensed directly.

b) The ABS system is partly dependent on measurements being undertaken on one or several other wheels in order to function properly.

c) Blocking of brakes are prevented, but the braking distance may be extended.

d) As a consequence of item a) above, the ABS system is unreliable at low speeds.

e) An ABS system renders no possibility for displaying the current friction conditions to a vehicle driver, for example an airplane pilot.

f) The ABS systems function at their best at high values of the friction coefficient. Because the optimum slip is totally different under slippery driving conditions, the ABS systems are not optimum under such conditions.

For the present invention the corresponding items hold valid:

a) It is not necessary to measure the wheel rotation speed.

b) If it is desired, each wheel may operate and be measured independently.

c) The braking distance is reduced essentially in all existing road and weather conditions, and at all existing speeds.

d) The system in accordance with the present invention is exactly as reliable at low speeds as at high speeds.

e) It is possible to present values of e.g. the friction coefficient in a display with the vehicle driver, in such a manner that information actually is given regarding the current braking conditions. In this respect a continuous electronic monitoring of the road conditions is actually undertaken by means of the present system.

f) It is actually a fact that when using a braking system in accordance with the present invention, the electronic circuitry functions at its best in the case of typically "flat" friction coefficient curves (see FIG. 1, curve 7) which is typically found in connection with a slippery road surface. In other words, the present system functions well exactly in those situations where achieving optimum braking is important.

I claim:

1. A method for achieving optimum braking of a vehicle wheel having an axle and a ground surface interface, comprising measuring continuously forces acting on the wheel axle, including a road normal force $F_{norm}$ perpendicular to a ground surface on which the wheel travels and a road parallel force $F_{par}$ parallel to said surface, by means of at least one force measuring device, wherein braking power is controlled by means of an electronic control unit in accordance with results of running calculations based upon the force measurements, said force measuring devices being connected to said control unit, and an approximate braking ratio $F_{par}/F_{norm}$ as well as a variation thereof are determined continuously in the control unit from the measured force values during a braking procedure where braking power is increased or decreased in a continuous manner on the basis of said approximate braking ratio $F_{par}/F_{norm}$ and the variation thereof, to obtain a maximum instantaneous braking ratio, said maximum instantaneous braking ratio being substantially equal to an instantaneous friction coefficient $\mu$ for the instant ground surface interface of said wheel.

2. A method in accordance with claim 1, wherein said braking power is only influenced by the electronic control unit if an optimum braking effect is necessary.

3. A braking system for a wheeled vehicle comprising operator's brake operating devices, brake command transmitting means for transmitting a brake command from said operating devices to a braking power supply means to which is also connected an electronic control unit, and braking exercising means attached to the vehicle wheels, said braking power supply means being operatively connected to said braking exercising means;

further comprising at least one force measuring device attached to an axle of at least one of the vehicle wheels for measuring continuously forces on said axle comprising a road normal force $F_{norm}$ perpendicular to a surface on which the vehicle is to travel and a road parallel force $F_{par}$ parallel to said surface, and being connected to said electronic control unit for signal delivery, wherein said electronic control unit comprises means to increase or decrease braking power from said braking power supply means to said braking exercising means during a braking procedure, in accordance with results of continuous calculations of an approximate braking ratio $F_{par}/F_{norm}$ as well as a variation thereof, on the basis of measured force values delivered to the electronic control unit from said force measuring devices, to obtain a maximum instantaneous braking ratio, said maximum instantaneous braking ratio being substantially equal to an instantaneous friction coefficient $\mu$ for the instant wheel to ground interface.

4. A method for achieving optimum propulsive traction for a vehicle wheel having an axle and a ground surface interface, comprising:

measuring continuously forces acting on the wheel axle, including a road normal force $F_{norm}$ perpendicular to a ground surface on which the wheel travels and a road parallel force $F_{par}$ parallel to said surface, by means of at least one force measuring device, wherein propulsive traction power is controlled by means of an electronic control unit in accordance with results of running calculations based upon the force measurements, said force measuring devices being connected to said control unit, and an approximate propulsion ration $F_{par}/F_{norm}$ as well as a variation thereof are determined continuously in the control unit from the measured force values during a propulsion procedure where propulsion power is increased or decreased in a continuous manner on the basis of said approximate propulsion ratio $F_{par}/F_{norm}$ and the variation thereof, to obtain a maximum instantaneous propulsion ratio, said maximum instantaneous propulsion ratio being substantially equal to an instantaneous friction coefficient $\mu$ for the instant ground surface interface of said wheel.

5. A method in accordance with claim 4, wherein the traction power is only influenced by the electronic control unit if optimum traction effect is necessary.

6. A propulsive traction system for a wheeled vehicle comprising operator's propulsive traction operating devices, propulsion command transmitting means for transmitting a propulsion command from said operating devices to a propulsion power supply means to which is also connected an electronic control unit, and propulsion exercising means attached to the vehicle wheels, said propulsion power supply means being operatively connected to said propulsion exercising means;

further comprising at least one force measuring device attached to an axle of at least one of the vehicle wheels for measuring continuously forces on said axle comprising a road normal force $F_{norm}$ perpendicular to a surface on which the vehicle is to travel and a road parallel force $F_{par}$ parallel to said surface, and being connected to said electronic control unit for signal delivery, wherein said electronic control unit has means to increase or decrease braking propulsive power from said propulsion power supply means to said propulsion exercising means during a propulsion procedure, in accordance with results of continuous calculations of an approximate propulsion ratio $F_{par}/F_{norm}$ as well as a variation thereof, on the basis of measured force values delivered to the electronic control unit from said force measuring device, to obtain a maximum instantaneous propulsion ratio, said maximum instantaneous propulsion ratio being substantially equal to an instantaneous friction coefficient $\mu$ for the instant wheel to ground interface.

7. A method for achieving both optimum propulsive traction force and optimum braking of a vehicle wheel having an axle and a ground surface interface, comprising:

measuring continuously forces acting on the wheel axle, including a road normal force $F_{norm}$ perpendicular to a ground surface on which the wheel travels and a road parallel force $F_{par}$ parallel to said surface, by means of at least one force measuring device, wherein propulsive traction power and braking power are controlled by means of an electronic control unit in accordance with results of running calculations based upon the force measurements, said force measuring devices being connected to said control unit, and a force ratio $F_{par}/F_{norm}$ as well as a variation thereof being determined continuously in the control unit from the measured force values during a vehicle speed change procedure where one of the propulsive traction power and the braking power is increased or decreased in a continuous manner on the basis of said force ratio $F_{par}/F_{norm}$ and the variation thereof, to obtain a maximum instantaneous force ratio, said maximum instantaneous force ratio being approximately equal to an instantaneous friction coefficient $\mu$ for the instant ground surface interface of said wheel.

* * * * *